Jan. 5, 1960
N. J. THOMPSON
2,919,927
SEAT-PROVIDED MARKET CART
Filed April 21, 1958
2 Sheets-Sheet 1
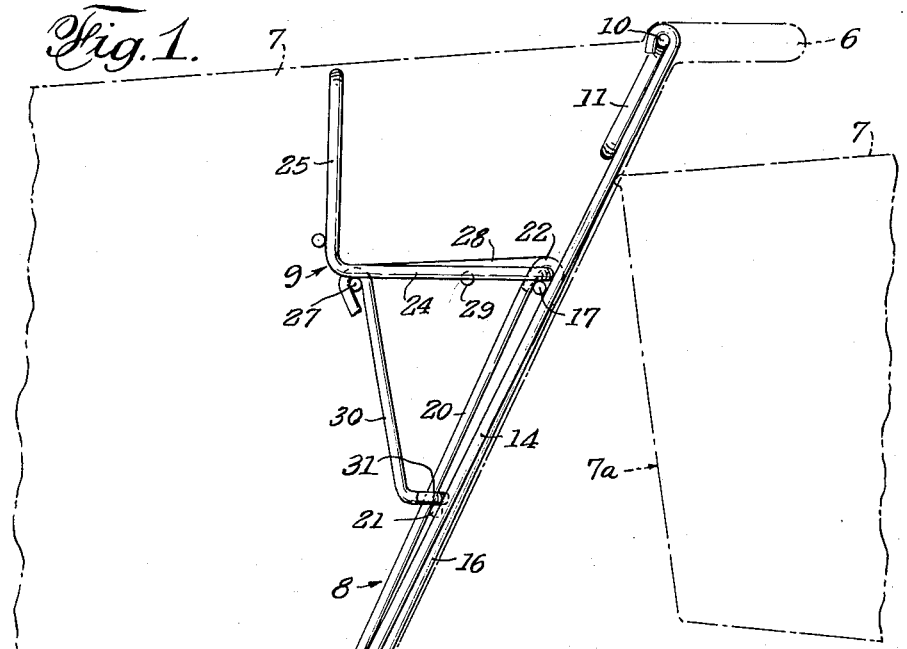
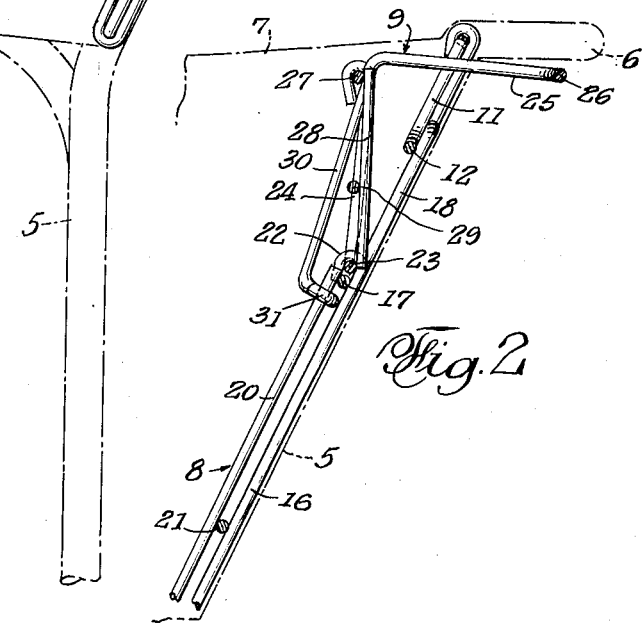
INVENTOR.
NORRIS J. THOMPSON
BY C. G. Stratton
ATTORNEY

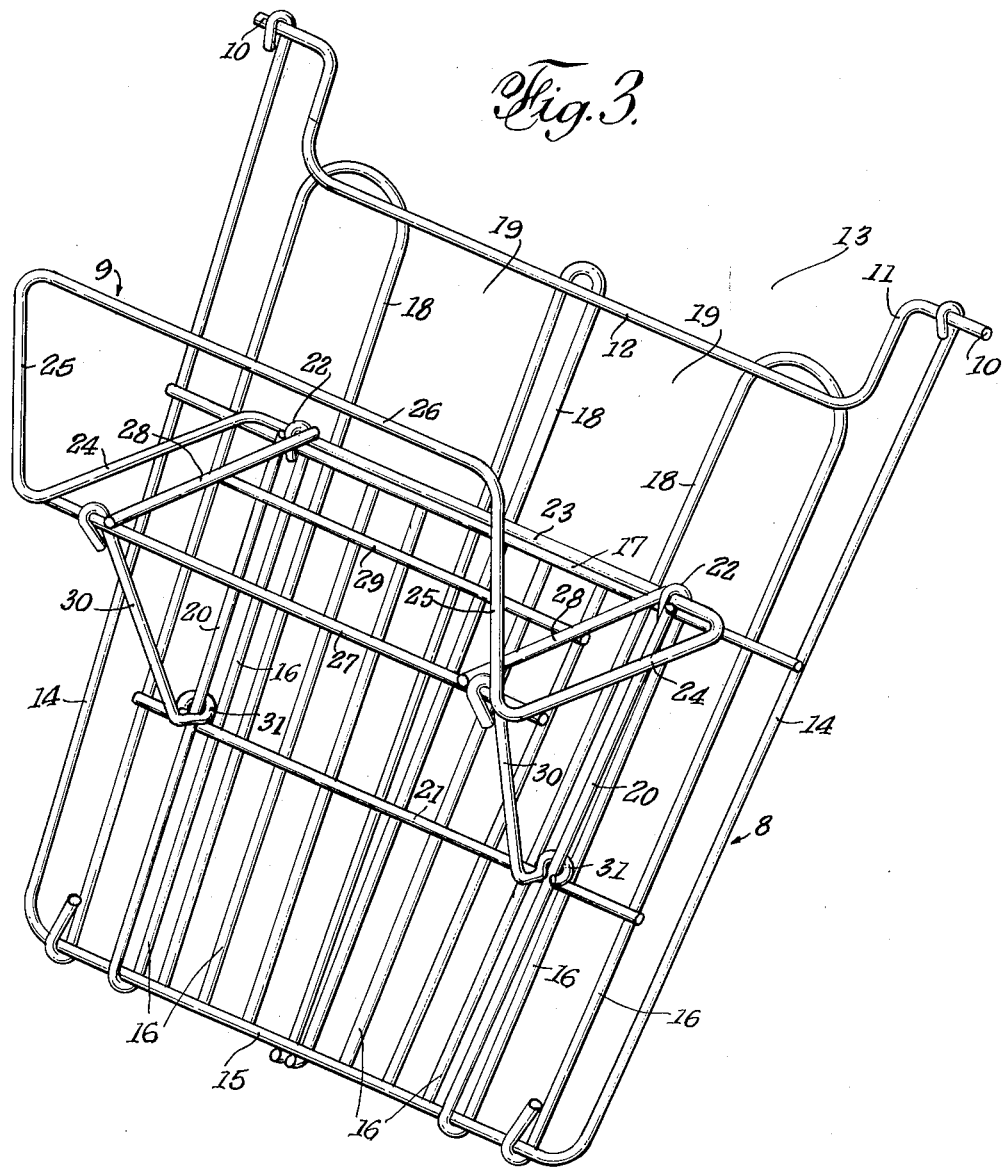

United States Patent Office 2,919,927
Patented Jan. 5, 1960

2,919,927

SEAT-PROVIDED MARKET CART

Norris J. Thompson, Los Angeles, Calif., assignor to Shopping Bag Food Stores, El Monte, Calif., a corporation of California Application April 21, 1958, Serial No. 729,615

5 Claims. (Cl. 280—33.99)

This invention relates to a market cart structure that is provided with a child's seat, the purpose of the present invention being to provide a shopper with a safe place to place a small child during movement of the cart along the market aisles, thereby greatly facilitating the tour among the merchandise flanking the aisles.

An object of the present invention is to so combine the hinged rear end wall of a basket or container on a market cart with a child's seat that the latter is independently foldable to an out-of-the-way position as well as movable with the end wall to a raised position when two carts are being stacked.

Another object of the invention is to provide a novel seat structure of the character referred to in which the same is wholly carried by the end wall of the basket of a market cart.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a side elevational view of the rear end wall of the basket of a market or grocery cart and showing a child's seat, according to the present invention, affixed to said wall and in child-supporting position, the view showing portions of the frame of the cart.

Fig. 2 is a fragmentary vertical sectional view showing the seat folded to an out-of-the-way position.

Fig. 3 is an enlarged perspective view of a combined end wall and child's seat such as shown in Figs. 1 and 2 with the seat in the position of Fig. 1.

In dot-dash lines, the drawing shows a conventional cart frame 5 provided with the usual handle 6 by means of which the cart is pushed on caster wheels (not shown). A container or basket 7 is mounted on said frame and also is conventional. The present improvements comprise the rear wall 8 of said basket, and the provision of a foldable child's seat 9 wholly carried by said wall 8.

In order to enable the baskets 7 of two carts to nest or stack one within the other to save storage space, the wall 8 is provided with trunnions 10 by means of which the wall 8 is pivotally connected either to the side walls of the basket or the frame 5, as the case may be. In any case, the upper end of the wall 8 has a hinged connection with the cart, the wall normally hangs pendent or at a conventional forward angle, as shown, and said wall is adapted to be swung inwardly and upwardly on said trunnions 10 by the front 7a of the basket 7 of another cart to enable space-saving stacking or telescoping of the carts.

Fig. 1 shows such a second cart about to engage and swing the wall 8 inwardly and upwardly. The foregoing is generally conventional, but is here described for the purpose of showing that a wall 8, provided with the improved seat 9, is capable of swinging upwardly for cart-stacking purposes.

The wall 8 that is illustrated is preferably formed of heavy wire or rods as is the case with the other walls of the basket 7. In the wall illustrated in Fig. 3, an upper rod 11 has the trunnions 10 on the opposite ends thereof and the middle part 12 thereof is downwardly offset to provide a recess 13 in the upper end of the wall. Said rod 11 is connected by side rods 14 to a bottom rod 15. In this case, the rods 14 and 15 are integral. The frame thus formed is spanned, between the rods 11 and 15, by a plurality of filler rods 16. Some of said rods 16 terminate at a cross rod 17 while others are continued to form three spaced loops 18—one in the middle and the others, one on each side. Said loops are so spaced from each other as to form substantial openings 19 of a size capable of passing the feet and legs of a child supported by the seat 9. It will be noted that, between rods 15 and 17, the wall is so enclosed by the rods 16 as to form a suitable barrier against spillage of items stored within the basket 7.

On the inner side of the wall and transversely spaced there is provided a pair of guide rods 20 that are each formed as a doubled back extension of one of the rods 16. Intermediate the length of the guide rods 20, a second cross rod 21 is provided, the same constituting a stop that defines the lower effective end of rods 20.

The upper ends of the rod 16 from which the rods 20 are doubled back are formed with hinge eyes 22, these eyes being disposed immediately above the cross rod 17.

The seat 9 is formed of rods similar to those previously described. A rearward cross rod 23 is engaged in the hinge eyes 22 and forwardly directed side rods 24 extend integrally from the ends of rod 23, said rods 24 being upwardly bent at their ends to form the sides 25 of the back of seat 9. A transverse rod 26 connects the ends of said rods 25. Thus, the rods 23, 24, 25 and 26 form a rectangular frame that is folded midway of the rods 24 to form a back and a seat part. Said frame is reinforced by a rod 27 that extends transversely between the rods 24 adjacent the bends therein, a pair of rods 28, one adjacent each side rod 24 and connecting the rods 23 and 27, and a second transverse rod 29 that connects rods 28 intermediate the rods 28. Thus, the seat part is provided with a supporting set of rod members capable of comfortably supporting a seated child with its back against the rod 26 and its legs extended through the wall openings 19.

As seen best in Fig. 1, the seat 9 is normally supported with its seat part horizontal although the wall 8 normally has an inclined disposition. The seat is supported by a pair of braces 30 that are hingedly connected at one end to the seat rod 27 between rods 24 and 28 and are slidably connected, as by eyes 31 on the other end, with the guide rods 20. The stop rod 21 limits the low position of the eyes 31, thus effectively supporting the seat.

It will be clear that, because said braces 30 are hinged to the seat, the seat may be swung over to the position of Fig. 2 as the eyes 31 slide upwardly on the guide rods. This sliding movement is limited by rod 17 and it will be evident that the back of the seat assumes a position extending through or into the recess 13 of the wall 5. Folded back in this manner, the seat clears the area of the basket adjacent the wall 8 for receiving items of merchandise. In any case, even with the seat down, the space therebeneath can be used for storage of items.

It will also be noted that the rod 26 of the seat back is clear of the cart handle 6 when the seat is folded up.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. In a market cart having a basket with a sloping wire assembly wall hinged at the upper end, in combination with such a hinged wall, a child's wire seat having front and back edges and a back in fixed positional relation to the seat, the wall having openings to receive legs of a child on said seat, a recess in the end of the wall above said openings, hinge means connecting the forward edge of the seat to the wall adjacent the lower edge of said leg openings for enabling the seat to swing on its hinge means and the back to extend into the aforesaid recess, and sliding wire seat props having upper ends pivotally connected to the back edge of the seat and lower ends slidingly connected to the wall with a cross bar abutting the lower ends of the props when the seat is level.

2. The combination of claim 1 wherein the hinge means for the seat comprises a cross wire and wire loop means, one connected to the front edge of the seat and the other to the wall.

3. The combination of claim 2 wherein the wire wall includes guide rods extending in the up and down direction of the wall, and the wire props are formed with end loops in a substantially horizontal plane at the lower end, each encircling one of the guide rods, and the pivotal connection of the props to the seat comprises a cross rod and wire loops means, one at the back edge of the seat and the other at the upper ends of the wire props.

4. In a market cart having a basket with a rear wall, the combination with said rear wall of a hinge at the upper end thereof, a support for a child comprising a seat and a rigidly connected back, a hinge connecting said child's support to a portion of the rear wall intermediate the upper and lower ends of the wall, said rear wall, above said hinge, having leg openings for the legs of a child on the support, brace means connecting the child's support and said wall between the mentioned hinge and the lower end of the wall to hold the support on its hinge in child-supporting position, and means retaining connection of the brace means and the wall in all positions of the support.

5. In combination, a basket wall and a child's seat having front and back edges, the wall having openings to receive the legs of a child on said seat, a recess in the end of said wall above said openings, hinge means connecting the forward edge of the seat to the wall immediately adjacent to the lower end of said leg openings, the seat being provided with a back and adapted to swing on its hinge means from child-supporting position to a position with the back partly extending into the mentioned recess, sliding seat props connected to the back edge of the seat and having sliding engagement with the wall, and lower abutments for said props to support the seat in child-supporting position.

References Cited in the file of this patent

UNITED STATES PATENTS

| | | |
|---|---|---|
| 1,763,932 | Konop | June 17, 1930 |
| 2,662,661 | Goldman | Dec. 15, 1953 |
| 2,662,775 | Goldman | Dec. 15, 1953 |
| 2,769,645 | Young | Nov. 6, 1956 |
| 2,813,725 | Hoedinghaus et al. | Nov. 19, 1957 |